United States Patent [19]
Wojtowicz et al.

[11] 3,718,598
[45] Feb. 27, 1973

[54] PREPARATION OF CHLORIDE-FREE HYPOCHLOROUS ACID SOLUTIONS

[75] Inventors: John A. Wojtowicz, Cheshire; Milton Lapkin, Woodbridge; Mohindar S. Puar, Hamden, all of Conn.

[73] Assignee: Olin Mathieson Chemical Corporation

[22] Filed: Aug. 5, 1970

[21] Appl. No.: 61,456

Related U.S. Application Data

[62] Division of Ser. No. 792,761, Jan. 21, 1969, Pat. No. 3,578,400.

[52] U.S. Cl. ............252/187 R, 252/94, 252/187 H, 252/364, 423/473
[51] Int. Cl. ..............................................C01b 11/04
[58] Field of Search ......252/187, 364, 94, 99; 23/86, 23/152; 423/473

[56] References Cited

UNITED STATES PATENTS

| | | | |
|---|---|---|---|
| 1,481,039 | 1/1924 | Taylor et al. | 252/187 |
| 1,632,484 | 6/1927 | MacMullin | 23/86 |
| 1,632,485 | 6/1927 | MacMullin | 23/86 |
| 3,527,708 | 9/1970 | Clark et al. | 252/364 |
| 2,850,461 | 9/1958 | Bloch et al. | 252/364 |

*Primary Examiner*—Leon D. Rosdol
*Assistant Examiner*—Irwin Gluck
*Attorney*—Gordon D. Byrkit, Walter D. Hunter, Donald F. Clements, Ellen P. Trevors, Richard S. Strickler, Robert H. Bachman and Donald R. Motsko

[57] ABSTRACT

Solutions of hypochlorous acid (HOCl), free chloride and chlorine are prepared by extraction of aqueous chlorination mixtures containing HOCl and chloride using an extraction solvent selected from the group consisting of lower alkyl ketones, lower alkyl cyanides and lower alkyl esters of lower alkanoic acids. The lower alkyl suitably contains one to five carbon atoms and the lower alkanoic acids suitably contain one to five carbon atoms. The resulting solutions, containing from about 0.5 to about 50 percent by weight of HOCl, are useful for chlorohydrination reactions where the presence of chloride or chlorine is deleterious.

2 Claims, No Drawings

PREPARATION OF CHLORIDE-FREE HYPOCHLOROUS ACID SOLUTIONS

This application is a division of U.S. Ser. No. 792,761 filed Jan. 21, 1969 now U.S. Pat. No 3,578,400, issued May 11, 1971.

This invention relates to the preparation of hypohalous acids, and more particularly pertains to a novel process of preparing hypochlorous acid solutions which are substantially free from halide ions, such as chloride ions.

Hypochlorous acid, usually in the form of its aqueous solutions, is employed in a relatively large number of chemical and industrial processes. For example, in the production of organic chlorohydrins, a hypochlorous acid solution is interacted with unsaturated organic compounds, which include the olefins, such as ethylene, propylene, butylenes, amylenes, and the like, members of the acetylene series as acetylene, propyne, butyne, and their homologues, diolefins, such as allene, butadiene, isoprene, alcohols as allyl alcohol and cinnamyl alcohol, aldehydes and ketones as acrolein and mesityl oxide, esters as allyl acetate, ethers as allyl ether, halides as vinyl chloride, allyl bromide, allyl chloride, methallyl chloride, acetylene dichloride, and the like, and their homologues and analogues. Also, hypochlorous acid is sometimes employed for the manufacture of hypochlorites, particularly when it is desired to produce high-grade particularly when hypochlorites which are substantially free from various undesirable impurities.

One of the common methods of synthesis of a hypohalous acid includes the reaction between water and a halogen. For instance, the production of hypochlorous acid by the reaction of chlorine and water follows the equation:

$$H_2O + Cl_2 \rightarrow HOCl + HCl$$

In order to neutralize the hydrochloric acid formed as a result of the aforementioned reaction, it is customary to employ an alkali, such as sodium or calcium hydroxide, or the like. The addition of such alkali neutralizes the hydrochloric acid, but simultaneously forms an inorganic halide, which, in most cases, is water-soluble, thus forming an aqueous hypochlorous acid solution containing a greater or lesser concentration of halide ions. The presence of this inorganic halide in the hypochlorous acid is frequently highly undesirable, when the hypochlorous acid is employed for the chlorohydrination of unsaturated organic compounds of the classes defined hereinabove. The presence of halide ions tends to form undesirable by-products of the type of organic halides or polyhalides, when such hypochlorous acid solutions are employed as one of the reactants in the above-mentioned chlorohydrination reactions. For instance, when allyl chloride is intimately commingled with an aqueous hypochlorous acid solution containing such free chloride ions, the reaction products contain excessive quantities of organic chlorides of the type of trichloropropane and tetrachloropropyl ether. Similarly, the reaction between ethylene and these chloride ions containing aqueous solutions of hypochlorous acid, instead of producing quantitative yields of ethylene chlorohydrin, also results in the formation of ethylene dichloride. In fact, even when the chlorohydrination of unsaturated organic compounds with such aqueous hydrochlorous acid solutions containing halide ions is effected under the most optimum conditions, the reaction products still contain relatively high percentages of organic halides.

It is therefore the main object of the present invention to provide a process for the efficient and economic production of hypochlorous acids which are free from or which contain only very limited quantities of inorganic halides. A further object is to provide a process for the production of aqueous hypochlorous acid solutions which are substantially free from chloride ions. A still further object is to produce relatively concentrated hypochlorous acid solutions substantially free from chloride ions.

It is known in the art that aqueous hypochlorous solutions may be separated from associated materials by extraction. However, the known methods generally do not form true solutions. The polyhalogenated aliphatics which are mentioned as suitable solvents extract only trace amounts of hypochlorous acid from aqueous solutions. The prior art also suggests that the presence of a small amount of alcohol is desirable. It is well known that alcohols react readily with hypochlorous acid to form organic hypochlorites so that extraction of hypochlorous acid in the presence of an alcohol does not lead to hypochlorous acid solution but rather to solutions of compounds of hypochlorous acids. See, for example, Sandmeyer, Ber. 18, 1767 (1885); 19, 859 (1886); Taylor et al., J. Am. Chem. Soc. 47, 395 (1925) and U. S. Pat. Nos. 1,481,039; 1,481,040; 1,632,483; 1,632,484 and 1,632,485.

However, certain solvents have now been discovered which extract hypochlorous acid essentially free of chloride without concomitant compound formation. These solvents also have the very important advantage of being chemically stable to hypochlorous acid at low temperatures and having reasonable chemical stabilities at ambient conditions, thereby permitting their use for the intended purposes. These solvents having the unusual and unexpected property of being able to extract hypochlorous acid from aqueous salt solutions to produce organic solutions of hypochlorous acid essentially free of chloride ion are selected from the group consisting of lower alkyl ketones, lower alkyl cyanides and lower alkyl esters of lower alkanoic acids where said lower alkyl contains from one to five carbons inclusive. Examples of solvents useful according to the invention include acetone, methyl ethyl ketone, methyl isobutyl ketone, diethyl ketone, di-n-propyl ketone, acetonitrile (methyl cyanide), propionitrile (ethyl cyanide), methyl acetate, ethyl acetate and methyl propionate.

It has further been discovered that the extractions need not be conducted as a separate step, since the solvents can also be present during the formation of the hypochlorous acid. The extractant can therefore serve as a co-solvent and remove the hypochlorous acid from the reaction site as it forms. The process of the invention thus generally comprises preparing solutions of hypochlorous acid substantially free from chloride by mixing at temperatures of +10° to −30° C. an aqueous solution containing chloride and hypochlorous acid with an extraction solvent selected from the class consisting of lower alkyl ketones, lower alkyl cyanides and lower alkyl esters of lower alkanoic acids and separating the resulting solution of hypochlorous acid in said solvent from the resulting aqueous phase. The product of the invention comprises a solution of hypochlorous acid in a solvent selected from the group consisting of lower alkyl ketones, lower alkyl cyanides and lower alkyl esters of lower alkanoic acids. In the present specification and claims the lower alkyl groups are meant to include those having one to five carbon atoms, inclusive. Also the lower alkanoic acids have one to five carbon atoms, inclusive.

By varying the water content of the aqueous mixture of base which is chlorinated to produce HOCl and by varying the proportion of extraction solvent, the concentration of HOCl in the solvent is suitably controlled to produce solutions having a concentration of HOCl of from 0.1 molar or less to about 10 molar or more, 0.525 percent to 52.5 percent by weight. Conveniently solutions of about 0.5 to 5 molar are readily prepared, stored and used. These solutions are stable at temperatures below 0° C. and are sufficiently stable for use when stored at ambient temperatures for several days.

In the preparation of aqueous hypochlorous acid for use in the extraction process of this invention, by chlorination of aqueous alkali, chloride is concomitantly formed in the solution according to the equation above. In a particularly advantageous form of the present invention, additional chloride is added to the aqueous hypochlorous acid or to the aqueous mixture of alkali to be chlorinated. The additional chloride lowers the freezing point of the aqueous phase and facilitates chlorination and extraction at lower temperatures. Advantageously, though not necessarily, the chlorinations are carried out in the range of about 0° to −30° C. The extractions are suitably carried out at temperatures of about +10° to −30° C. since the stability of the HOCl in the aqueous chloride solution before extraction is somewhat less than in the organic solution after extraction.

Alkalies suitable for use in chlorination to form the aqueous chloride-containing solution of HOCl to be extracted are suitably any alkali which with chlorine forms HOCl. More particularly useful are the alkaline compounds of the alkali metals and alkaline earth metals. Their oxides, hydroxides and carbonates are suitable including specifically sodium hydroxide, potassium hydroxide, sodium carbonate, calcium oxide, calcium hydroxide and calcium carbonate. Other alkaline compounds of the alkali metals and alkaline earth metals are also suitable.

While chlorination of alkalies, as described, is cheap and convenient for the preparation of aqueous solutions of HOCl, the solutions to be extracted according to this invention are suitably prepared by any other known methods.

EXAMPLE I

Extraction of Hypochlorous Acid from Aqueous Solutions

In several experiments, an aqueous solution of HOCl, cooled to −25° C. was mixed with cold solvent in a flask. In some experiments, additional NaCl or $CaCl_2$ was dissolved in the aqueous phase. The mixture was poured into a cold separatory funnel and separated into the organic and aqueous layers. Both layers were weighed and analyzed for HOCl to determine the distribution of HOCl between the two layers. The results are summarized in Table 1.

TABLE 1

Extraction of Aqueous Hypochlorous Acid at −25°

| Solvent | Salt Added | g./g. of Solvent wt. % | Aqueous Phase | HOCl Extracted,% | Comments |
|---|---|---|---|---|---|
| Acetone | $CaCl_2$ | 25 | 1 | 90+ | Very slow decomposition at 0°C. Less than 5% In 10 hours. |
| Acetonitrile | $CaCl_2$ | 25 | 1 | 87 | Solution stable for ½ hour at 0°C |
| Diethyl Ketone | | | 1 | 81 | Solution stable at 0°C. |
| Diethyl Ketone | NaCl | 22 | 0.67 | 92 | |
| Ethyl acetate | $CaCl_2$ | 25 | 1 | 90+ | Solution stable at 0°C. but gradually decomposes at room temperature |
| di-n-propyl acetate ketone | NaCl | 22 | 0.67 | 92 | |
| Methyl ethyl ketone | $CaCl_2$ | 25 | 0.52 | 95 | Extract stable at 0°C. |
| Methyl ethyl ketone | NaCl | 22 | 0.57 | 96 | Extract stable at 0°C. |
| Methyl ethyl ketone | | | 1 | 79 | Extract stable at 0°C. |

EXAMPLE II

Preparation of Chloride Ion-free HOCl Solutions from Caustic

The reactor was a one liter resin kettle fitted with a stainless steel stirrer having a teflon stirrer with an O-ring seal, thermometer and $Cl_2$ inlet. The $Cl_2$ was admitted through a mainfold containing a compound pressure gauge and port for evacuating the system. The following reactants were charged into the reactor: NaOH, 34.0 g. (0.833 mole ); NaCl, 144 g; $H_2O$, 655 g. The system was cooled to −20° C. and evacuated to 28" vacuum. The stirrer ran at high speed and $Cl_2$ (60 g.) was introduced from a cylinder (weighed on a Toledo scale) in 6 minutes. During the reaction the bath temperature was lowered to −33° C. but in spite of this the reaction temperature increased to −13° C. Stirring was continues for 1 to 2 minutes at −20° to −25° C. and then cold (−25° C.) methyl ethyl ketone (MEK) (446 g.) was added to extract the HOCl. Layers were separated in a precooled separatory funnel. A second extraction was made using 171 g. of MEK. Analysis of the extract and aqueous layers revealed the following compositions:

| Phase | Wt. g. | HOCl | $Cl_2$ | NaOCl | Cl | 
|---|---|---|---|---|---|
| | | | | Moles | |
| MEK | 642 | 0.816 | 0.006 | none | 0.01 |
| Aqueous | 853 | 0.003 | none | 0.005 | |

The yield of HOCl recovered in the methyl ethyl ketone solution was 98.9 percent based on the $Cl_2$ used and 99.5 percent based on the NaOH used. The procedure of this Example was essentially repeated numerous times with essentially the same results. Temperatures varied from −11° C. to −25° C.

In one preparation, the cold MEK solution containing 0.006 mole of dissolved chlorine in 642 g. of MEK solution was washed with 50 g. of a 10 percent aqueous solution of sodium bicarbonate. The aqueous solution froze and was separated by filtration. The MEK solution of HOCl then contained no free chlorine.

EXAMPLE III

Preparation of Chloride Ion-free HOCl Solutions from Slaked Lime

In a typical experiment the following reactants were charged into a round bottom, 3-neck, one liter flask fitted with stirrer, thermometer and $Cl_2$ inlet: $Ca(OH)_2$ 25 2 g. (0.342 mole); $CaCl_2$, 194 g.; $H_2O$, 647 g. The slurry was cooled to −25° using Dry Iceacetone and chlorine (50 g., 0.705 mole) was introduced through a rotameter in 45 minutes. After purging for 15 minutes with $N_2$ to remove excess $Cl_2$, the HOCl was extracted with 472 g. of methyl ethyl ketone (MEK) cooled to −25° C. in a precooled separatory funnel. The composition of the two phases was as follows:

| Phase | Wt. g. | HOCl, moles | % $H_2O$ | % MEK |
|---|---|---|---|---|
| MEK | 442 | 0.59 | 6.5 | |
| Aqueous | 927 | 0.03 | | 8.2 |

The yield of HOCl recovered in the MEK solution was 97.5 percent based on the $Cl_2$ used and 95.8 percent based on the $Ca(OH)_2$ used. The procedure of this Example was repeated numerous times with essentially the same results. Temperatures varies from about −25° to −30° C. The concentration of HOCl in the MEK was about 6 to 7 percent by weight.

EXAMPLE IV

Preparation of HOCl from Slaked Lime in Aqueous MEK

In a typical experiment $Ca(OH)_2$, 3.70 g. (0.049 mole) was slurried in 90 cc. of MEK and 10 cc. $H_2O$. The well-stirred mixture was cooled to −25° C. and $Cl_2$ (100 millimoles) was introduced through a rotameter at 7 millimoles per minute. The stirring was stopped and solids were allowed to settle. Aliquots were withdrawn for $Cl_2$ and HOCl analysis. The volume of the organic layer was about 35 cc. and the volume of the aqueous layer was 11 cc. Analysis of the MEK solution showed the presence of 3.5 millimoles $Cl_2$ and 84 millimoles HOCl; yield was 86 percent based on the slaked lime originally taken. The reaction was carried out quickly with rapid stirring in order to prevent freezing of the aqueous layer.

EXAMPLE V

Preparation of HOCl from Slaked Lime in Aqueous Acetone

The procedure was identical to that described in Example IV for the aqueous MEK system. In a typical reaction, a slurry of $Ca(OH)_2$, 3.7 g. (50 millimoles) in 90 cc. acetone and 10 cc. $H_2O$ was chlorinated with 100 millimoles $Cl_2$ at −25°C. The organic layer amounted to 81 cc. and the aqueous layer 14 cc. at −25°. After 3 hours stirring, analysis showed the presence of 14 millimoles $Cl_2$ and 86 millimoles HOCl in the acetone solution. The yield was 88 percent based on the slaked lime originally taken. After separation of the layers, the HOCl solution in aqueous acetone was kept at 0° C. It contained about 5.6% HOCl by weight.

EXAMPLE VI

Preparation of Calcium Hypochlorite

Slaked lime (3.33 g.; 43 millimoles) was added to 63.8 grams of a solution of HOCl in methyl ethyl ketone containing 90 millimoles of HOCl. The mixture stood with occasional shaking at a temperature of −25° C. for 3 days. The mixture was filtered, the solvent was removed in vacuum and the residual solid was vacuum dried at 50° to 69° C. under 0.1 mm. The dried calcium hypochlorite product contained 78.2 percent of available chlorine.

EXAMPLE VII

Preparation of Chloride Ion-free HOCl from Cell Liquor

A mixture of 569 g. of diaphragm cell liquor containing 13.0 percent of NaCl and 11.8 percent (1.68 moles) of NaOH and 1174 g. of brine containing 15.0 percent of NaCl was charged into a round-bottom, 3-neck 3-liter flask fitted with stirrer, thermometer and $Cl_2$ inlet. The well-stirred solution was cooled to −17° C. and 116 g. (1.63 moles) of $Cl_2$ was introduced during 11 minutes. The chlorinated solution was stirred for an additional 3 minutes and then extracted twice with 475 g. portions of methyl ethyl ketone (MEK). Analysis of the phases gave the following data;

| Phase | Wt. g. | HOCl, Moles | NaOCl, Moles | pH |
|---|---|---|---|---|
| Extract 1 | 487 | 1.30 | 0 | |
| Extract 2 | 485 | 0.23 | 0 | |
| Aqueous | 1838 | 0 | 0.044 | 8.1 |

The HOCl molality in Extract 1 was 2.66 and the HOCl yield, based on chlorine, was 98 percent.

EXAMPLE VIII

Preparation of Concentrated HOCl

Sodium hydroxide (34.0 g.; 98. percent assay; 0.833 mole) was dissolved in aqueous salt solution (144 g. NaCl in 656 g. $H_2O$) in a 2-liter flask fitted with stirrer, thermometer and $Cl_2$ sparger. Chlorine (59.1 g.; 0.833 mole) was introduced into the well-stirred solution, cooled to −20° C. during 6 to 8 minutes. After stirring for an additional 2 minutes, 80 g. of methyl ethyl ketone cooled to −25°C. was added and the reaction mixture was stirred rapidly for 1 minute and then the phases were separated in a precooled separatory funnel. The organic layer weighed 80 g. and contained 0.36 mole HOCl (24 wt. percent); molality = 4.50.

What is claimed is:

1. A solution of hypochlorous acid containing from 0.5 to 50 percent by weight of HOCl in a solvent selected from the class consisting of lower alkyl ketones, lower alkyl cyanides and lower alkyl esters of lower alkanoic acids.

2. A solution as claimed in claim 1 in which said solvent is methyl ethyl ketone.

* * * * *